United States Patent [19]

Gagnon

[11] Patent Number: 4,854,665
[45] Date of Patent: Aug. 8, 1989

[54] COUPLING FOR JOINING AXIAL SECTIONS OF DUCT FOR FIBER OPTIC CABLES

[75] Inventor: Bernard Gagnon, Manchester, Conn.
[73] Assignee: Endot Industries, Inc., Denville, N.J.
[21] Appl. No.: 651,096
[22] Filed: Sep. 17, 1984
[51] Int. Cl.$^4$ .............................................. G02B 6/44
[52] U.S. Cl. .................................................. 350/96.23
[58] Field of Search .................... 350/96.23; 174/84 R, 174/85, 91, 92, 93

[56] References Cited
U.S. PATENT DOCUMENTS

| | | | |
|---|---|---|---|
| 3,701,835 | 10/1972 | Eisele et al. | 174/92 |
| 3,711,632 | 1/1973 | Ghirardi | 174/92 |
| 4,426,108 | 1/1984 | Kesselman | 174/92 |
| 4,550,220 | 10/1985 | Kitchens | 174/92 |
| 4,558,174 | 12/1985 | Massey | 174/92 |

Primary Examiner—William L. Sikes
Assistant Examiner—Robert E. Wise
Attorney, Agent, or Firm—Robert S. Smith

[57] ABSTRACT

Apparatus for coupling the axial extremities of two associated inner ducts used for housing at least one fiber optic cable. The coupling includes first and second cylindrical sections, each having inner concave faces and outer convex faces and apparatus for engaging the axial extremities of the associated inner ducts. The apparatus for engaging is disposed on the inner face of the cylindrical sections. The apparatus also includes structure for providing mutual gripping between the first and second cylindrical sections. The structure for mutual gripping on the first and second cylindrical sections is disposed on the first and second cylindrical sections and functions only when the first and second cylindrical sections are engaged with at least one axial section of an inner duct.

13 Claims, 1 Drawing Sheet

COUPLING FOR JOINING AXIAL SECTIONS OF DUCT FOR FIBER OPTIC CABLES

BACKGROUND OF THE INVENTION

The invention relates to connectors for joining axial sections of so-called "inner duct". Such inner ducts are typically used to enclose 3 fiber optic cables. Three such inner ducts are typically positioned inside a conduit.

The enormous advantages of using fiber optic cables for telephone and other applications has fostered the installation of huge amounts of such fiber optic cable. This in turn has focused attention on the apparatus and methods for installing fiber optic cable. The inner duct used in such installations has a diameter of approximately one or two inches and is manufactured of medium or high density polyethylene. Some inner duct is manufactured with a smooth wall and, thus, has an appearance similar to polyvinyl chloride water pipe, which is often used for residential and commercial applications. Other inner duct is manufactured with a corrugated wall, which has successive axial sections with alternately larger and smaller diameters. The contour is, thus, not the contour of a helix. The present invention has particular application to the so-called corrugated inner duct.

It is highly desirable to join axial sections of the inner duct together in a manner which excludes moisture and other substances that would deteriorate the fiber optic cable. It is also highly desirable to join axial sections of the inner duct in a manner which has an axial tension strength at least as great as the axial tension strength of the inner duct itself. This is significant because the inner ducts must be pulled through a conduit into which they are installed in much the same manner that wires have historically been pulled through conduits.

The prior art includes various devices for joining axial sections of inner duct. These known sections have not been wholly satisfactory. For example, one known device is a metal sleeve having a central bore extending through it. Disposed in the bore are left and right hand threaded axial extremities, which engage respective axial sections of inner tube. This device is expensive to manufacture. In addition, it is difficult to install because of the necessity for rotating the sleeve. Other disadvantages include not being able to see the axial location of the inner tube inside the opaque metal sleeve to determine the length of the axial extremity which is actually engaging the sleeve. Still another problem concerns the use of metal, more particularly, metal which may (1) conduct electricity if there is a contact with external voltage source or (2) attract lightening.

A disadvantage of most known inner duct connectors is that it is necessary to splice the cables within the inner duct if the inner duct is damaged. In other words, if the inner duct is damaged it is necessary to cut the inner duct as well as the cables inside the inner duct in order to install a connector such as the metal sleeve-shaped connector described above.

Other prior art connectors or couplings have utilized external clamping members which interfere with cable pulling through conduits.

It is an object of the invention to provide a connector for inner duct which enables the user to see the physical location of the inner duct within the coupling.

It is another object of the invention to provide a connector which can be installed on broken axial sections of inner duct without the necessity for splicing of the cable inside the inner duct.

It is another object of the invention to provide apparatus which is non-metallic and, thus, will not conduct electricity which might damage the fiber optic cable.

It is another object of the invention to provide apparatus which is extremely simple to manufacture and which ideally includes two sections of a cylinder which are identical in construction.

It is another object of the invention to provide apparatus which has a smooth exterior to facilitate pulling of the fiber optic cables with the inner ducts surrounding them easily.

It is an object of the invention to provide a design which is simple and which has a minimum number of parts which are unique so that the cost of manufacturing individual parts as well as the cost of maintaining an inventory are minimized.

SUMMARY OF THE INVENTION

The foregoing objects and other objects and advantages which shall become apparent from the detailed description of the preferred embodiment are attained in an apparatus for coupling the axial extremities of two associated inner ducts used for housing at least one fiber optic cable. The coupling includes first and second cylindrical sections, each having inner concave faces and outer convex faces, and means for engaging the axial extremities of the associated inner ducts. The means for engaging is disposed on the inner face of the cylindrical sections. The apparatus also includes means for providing mutual gripping between the first and second cylindrical sections. The means for mutual gripping on the first and second cylindrical sections is disposed on the first and second cylindrical sections and functions only when the first and second cylindrical sections are engaged with at least one axial section of an inner duct.

The means for providing mutual gripping between the first and second cylindrical sections when the first and second cylindrical sections are engaged with at least one associated axial section of the inner duct may include a first lip on the first cylindrical section. The means for providing mutual gripping between the first and second cylindrical sections when the first and second cylindrical sections are engaged with an associated axial section of the inner duct may include a second lip on the second cylindrical section. The respective first lips on the first and second cylindrical sections may extend axially along the edge of the respective cylindrical section.

The first lip may include at least one upstanding nib on each of the first lips. The apparatus may further include a plurality of additional nibs upstanding from each of the first lips. Each of the nibs may extend in a direction which is generally radial with respect to the geometric axis of the cylindrical section connected thereto.

The means for providing mutual gripping may further include a second lip on each of the first and second cylindrical sections. The second lip may include at least one recess therein.

In some embodiments the first and second cylindrical sections may be dimensioned and configured for mutual engagement with each other and with each nib of the first lip of the first cylindrical section engaging a recess of the second lip of the second cylindrical section. The nibs of the first lip of the second cylindrical section may engage the recess of the second lip of the first cylindrical section. Each of the second lips may further include a plurality of additional recesses and each of the recesses may be disposed in registered relationship with one of the nibs when the first and second cylindrical sections are assembled. The means for engaging the axial extremities of the associated inner duct may include a plurality of annular ribs disposed at axially spaced intervals along the inner face of each of the first and second cylindrical sections. Each of the cylindrical sections may be substantially identical.

BRIEF DESCRIPTION OF THE ACCOMPANYING DRAWING

The invention will be better understood by reference to the accompanying drawing in which.

DESCRIPTION OF THE PREFERRED EMBODIMENT

Figure 1:
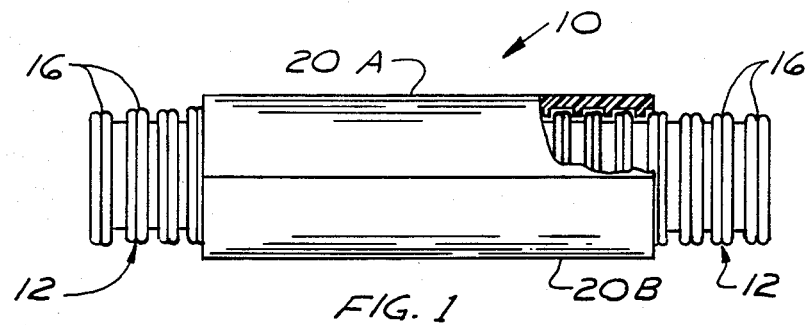
FIG. 1 is a partially broken away, side elevational view of two identical cylindrical sections which form the coupling in accordance with the invention cooperating with two axial sections of inner duct.

Referring now to FIGS. 1-4, there is shown a coupling 10 in accordance with one form of the invention. The coupling 10 is intended to join first and second axial sections of inner duct 12, 12. The inner duct 12, 12 has a corrugated construction. More specifically, the inner duct 12, 12 has a plurality of ribs 16 about the outer face thereof. Each of the ribs 16 is circular and extends around the entire circumference of the respective inner duct 12, 12 at uniform intervals. In other words, the pitch of the circular ribs 16 is uniform.

The coupling 10 includes first and second identical cylindrical sections 20A, 20B. It will be understood that although the cylindrical sections 20A, 20B are identical, the respective cylindrical sections and each aspect thereof will be identified by reference characters ending in either A or B to more clearly describe the nature of the construction. In other words, the description of the cylindrical section 20A will be understood to have an exact counterpart in the cylindrical section 20B.

Each cylindrical section 20A, 20B includes a plurality of annular ribs 22. The annular ribs 22 at each axial extremity of each cylindrical section 20A, 20B are disposed at uniform axial increments so that they register with the spaces intermediate the ribs 16 on the axial sections of the inner duct 12, 12 with which they cooperate. Disposed substantially at the axial mid-section of the cylindrical sections 20A, 20B is a divider 24 which, as best seen in FIG. 2, extends towards the geometric axis of the cylindrical sections 20A, 20B further than do the ribs 22, which engage the annular spaces intermediate the ribs 16 on the inner duct 12, 12.

Figure 2:
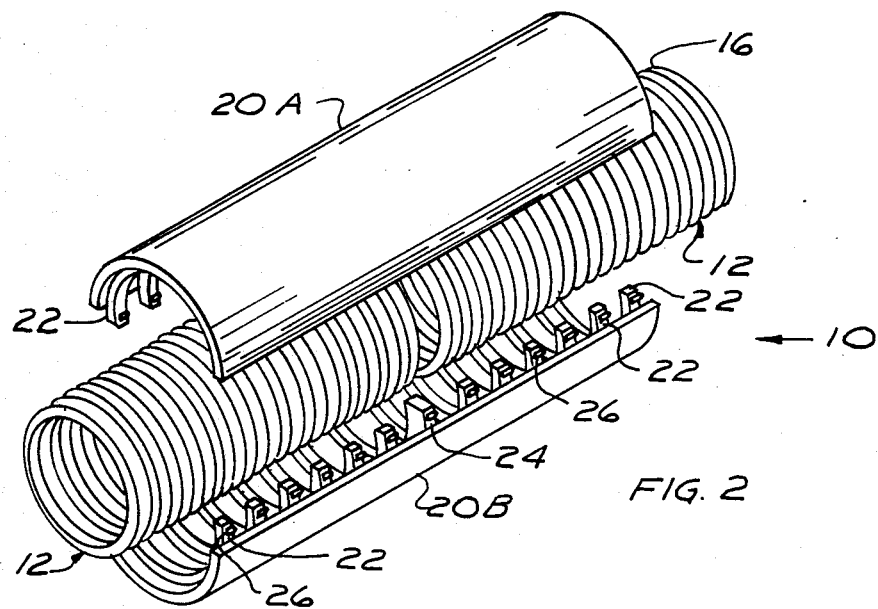
FIG. 2 is an exploded perspective view of the apparatus shown in FIG. 1.
Figure 3:
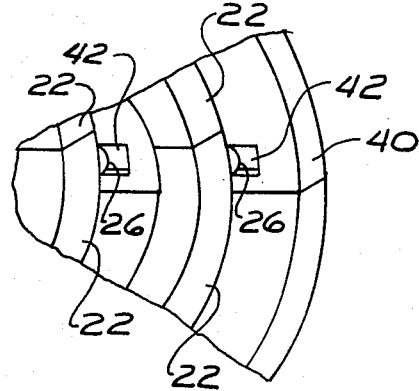
FIG. 3 is a perspective view to an enlarged scale of a nib and recess engaged.
Figure 4:
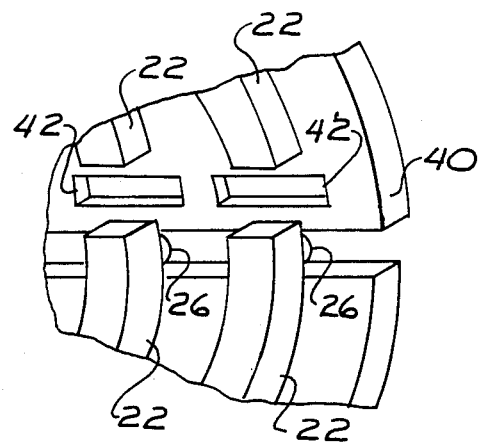
FIG. 4 is a view similar to FIG. 3 in which the nib and recess are disengaged.

As best seen in FIGS. 2-4, extending along the axially extending edges of the cylindrical sections 20A, 20B is a first lip which comprises a plurality of ribs 22. On each rib 22 there is disposed a nib 26, which, in the preferred embodiment, extends radially with respect to the geometric axis of the cylindrical section 20A or 20B of which it is a part. Each nib 26 is elongated axially, as best seen in FIG. 2.

Each cylindrical section 20A, 20B includes a second lip 40 extending along the other axial edge thereof. Each second lip 40 includes a plurality of recesses 42, which are engaged by nibs 26 when the cylindrical sections 20A, 20B are meshed, as best seen in FIG. 3.

The cylindrical sections 20A, 20B are dimensioned such that they will not snap together unless an inner duct 12 is disposed intermediate the respective cylindrical sections 20A, 20B. In operation, the respective inner ducts 12, 12 are placed within a cylindrical section 20A with the axial extremities of the respective inner ducts 12, 12 in end abutting relationship to the divider 24. Because the coupling 10 is manufactured of a translucent high density polyethylene, the relative axial positions of the inner ducts 12, 12 and the cylindrical sections 20A, 20B are apparent. The cylindrical section 20B will snap in place. Thereafter it may be secured more positively by applying a tape or other adhesive to more positively grip the surfaces together.

It will be seen that the coupling 10, when used in accordance with the invention, may be installed on a damaged area of inner duct 12, 12 without the necessity for splicing the fiber optic cable (not shown) inside the inner duct 12, 12. The user can readily observe the axial positions of the inner duct 12, 12 within the cylindrical sections 20A, 20B, ensuring positive gripping. The engagement between the six ribs 22 of the coupling 10 and the six ribs 16 of each inner duct 12, 12 provide a very positive engagement which ensures that there will be no relative axial movement during subsequent pulling operations. The strength of the coupling 10 is greater than the axial tension strength of the inner duct 12, 12 because the material has been chosen to have a higher tension strength per square inch than the inner duct 12, 12.

The coupling 10 in accordance with the invention has extreme simplicity of design in that both of the cylindrical sections 20A, 20B are identical. This means that the cost for stocking as well as the preparation of the original mold are minimized. In addition, the apparatus in accordance with the invention is advantageous because it eliminates all metallic members and also provides a smooth exterior having a relatively low coefficient of friction, which will slide relatively easily within an associated conduit (not shown) to ease pulling operations.

The invention has been described with reference to its illustrated preferred embodiment. Persons skilled in the art may, upon exposure to the teachings herein, conceive variations in the mechanical development of the components therein. Such variations are deemed to be encompassed by the disclosure, the invention being delimited only by the appended claims.

Having thus described my invention, I claim:

1. Apparatus for coupling the axial extremities of two associated inner ducts used for housing at least one fiber optic cable, said coupling comprising: first and second cylindrical sections, each having inner concave faces;

means for engaging the axial extremities of the associated inner ducts, said means for engaging being disposed on the inner face of said cylindrical sections; and means for providing mutual gripping between said first and second cylindrical sections, said means for providing mutual gripping between said first and second cylindrical sections being disposed on said first and second cylindrical sections, said first and second axial sections being substantially identical.

2. The apparatus as described in claim 1 wherein: said cylindrical section each have outer convex faces.

3. The apparatus as described in claim 2, wherein: said means for providing mutual gripping between said first and second cylindrical sections comprises a first lip on said first cylindrical section.

4. The apparatus as described in claim 3, wherein: said means for providing mutual gripping between said first and second cylindrical sections comprises a second lip on said second cylindrical section.

5. The apparatus as described in claim 4, wherein: said respective first lips on said first and second cylindrical sections extend axially along the edge of the respective cylindrical section.

6. The apparatus as described in claim 5, wherein: said first lip includes at least one upstanding nib on each of said first lips.

7. The apparatus as described in claim 6, further including:
a plurality of additional nibs upstanding from each of said first lips.

8. The apparatus as described in claim 7, wherein: each of said nibs extends in a direction which is generally radially disposed with respect to the geometric axis of said cylindrical section connected thereto.

9. The apparatus as described in claim 8, wherein: said means for providing mutual gripping further includes said second lip having at least one recess therein, said first and second cylindrical sections being dimensioned and configured for mutual engagement with each other and with each nib of said first lip of said first cylindrical section engaging said recess of said second lip of said second cylindrical section, said nibs of said first lip of said second cylindrical section engaging said recess of said second lip of said first cylindrical section.

10. The apparatus as described in claim 9, wherein: each of said second lips further comprise a plurality of additional recesses, each of said recesses being disposed in registered relationship with one of said nibs when said first and second cylindrical sections are assembled.

11. The apparatus as described in claim 10, wherein: said means for engaging the axial extremities of the associated inner duct comprises a plurality of annular ribs disposed at axially spaced intervals along the inner face of each of said first and second cylindrical sections.

12. The apparatus as described in claim 7, wherein: each of said nibs extends in a direction which is generally radial with respect to the geometric axis of said cylindrical section connected thereto.

13. The apparatus as described in claim 12, wherein: said means for providing mutual gripping further includes said second lip having at least one recess therein, said first and second cylindrical sections being dimensioned and configured for mutual engagement with each other and with each nib of said first lip of said first cylindrical section engaging said recess of said second lip of said second cylindrical section, said nibs of said first lip of said second cylindrical section engaging said recess of said second lip of said first cylindrical section.

* * * * *